United States Patent
Rahmsdorf et al.

(10) Patent No.: US 6,952,853 B2
(45) Date of Patent: Oct. 11, 2005

(54) SCREW DRIVING DEVICE

(75) Inventors: Horst Rahmsdorf, Munich (DE); Gerd Daubinger, Munich (DE); Felix Ferlemann, Hückeswagen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/319,703

(22) Filed: Dec. 12, 2002

(65) Prior Publication Data

US 2003/0145388 A1 Aug. 7, 2003

(30) Foreign Application Priority Data

Dec. 13, 2001 (DE) .......................................... 101 61 353

(51) Int. Cl.[7] .............................................. B23P 19/06
(52) U.S. Cl. .................... 7/158; 7/165; 81/434; 81/435
(58) Field of Search .................. 7/158, 165; 81/57.37, 81/433–435; 408/239 A

(56) References Cited

U.S. PATENT DOCUMENTS 4,517,863 A    5/1985 Ishikawa
5,409,333 A  * 4/1995 Hu .......................... 408/239 A
5,586,847 A  * 12/1996 Mattern et al. .......... 408/239 A
5,711,043 A  *  1/1998 Crawford et al. ............... 7/165

FOREIGN PATENT DOCUMENTS

DE       0522814       1/1997
DE       0047455       4/2002

* cited by examiner

Primary Examiner—Debra S Meislin
(74) Attorney, Agent, or Firm—Abelman, Frayne & Schwab

(57) ABSTRACT

A screw driving device (2) for a hand tool drilling device (1) includes a screw magazine (3) for successive feeding of screws or bolts (4), a feeder block (6) that can be axially displaced against the force of a feeder spring (5), which at least partially supplies screws (4) during the back and forth reciprocating movement of the feeder block (6), and a driving tool (8) that can be coupled rotationally in form locked manner with a screw head (7), wherein the driving tool (8) axially moveably receives a rotatingly driven drilling tool (9) in a coaxial hollow inner space and is spring biased axially by a clutch spring (10) relative to the screw driving device in a rotation driver position X, in which a drilling tool tip (11) is axially spaced from the screw head (7) and is coupled rotationally form locked with the driving tool (8).

8 Claims, 2 Drawing Sheets

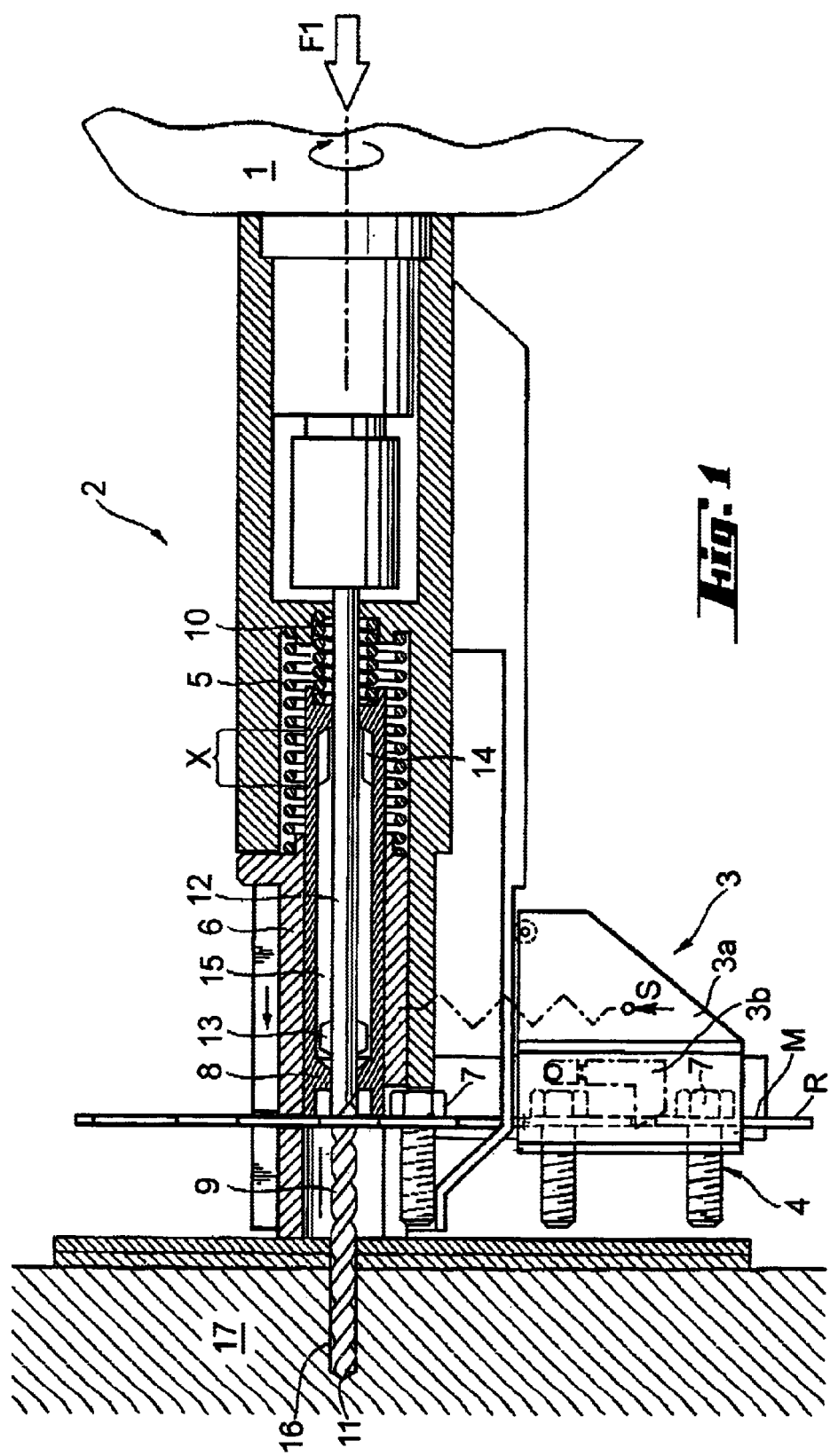

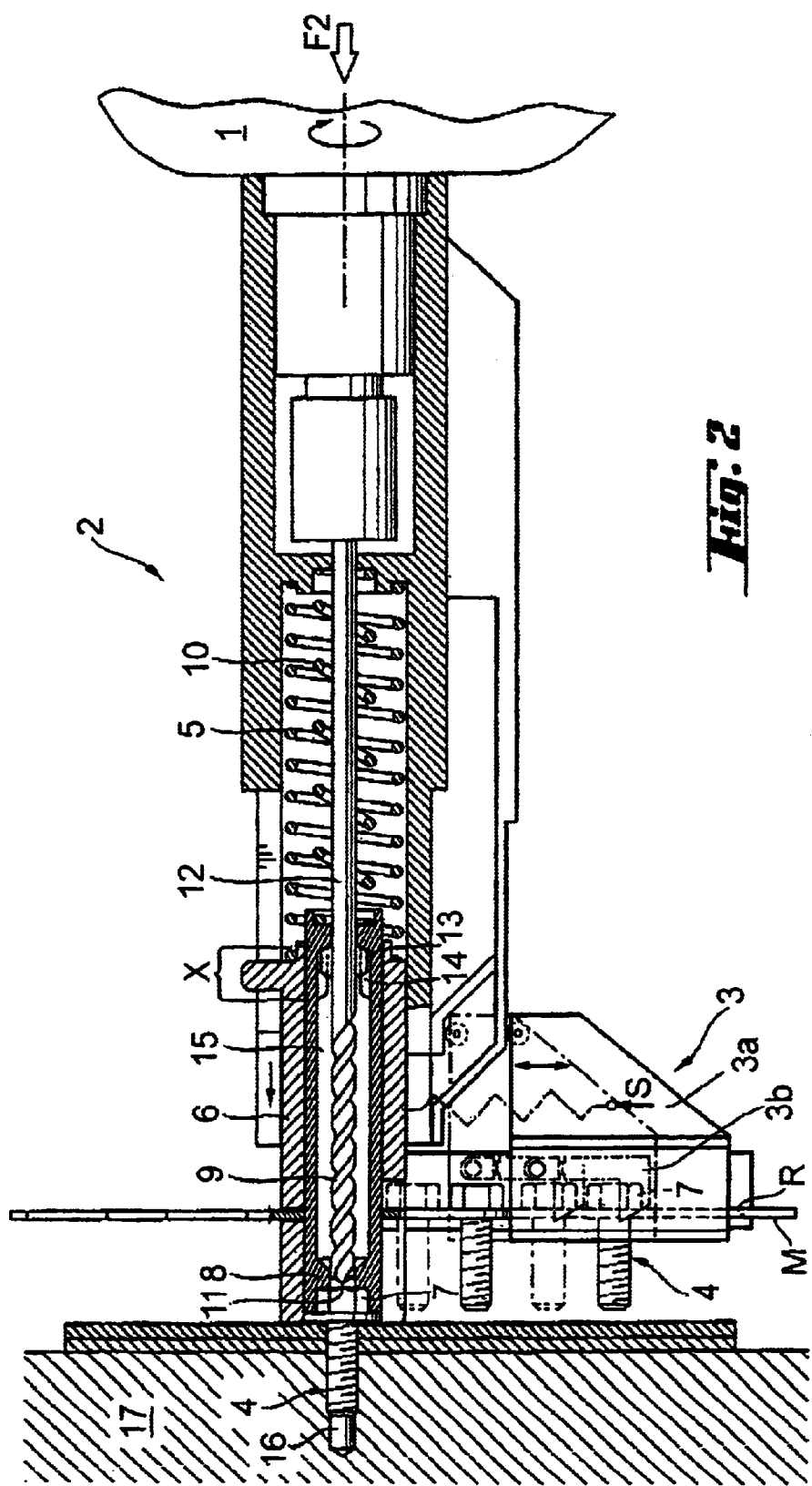

SCREW DRIVING DEVICE

BACKGROUND OF THE INVENTION

The invention relates to a screw driving device as an accessory for an electrical hand tool such as a drilling device for setting screws or bolts in previously drilled holes and an associated working procedure.

According to DE4407155 a device is disclosed as an accessory for a drilling device for setting screws comprised of a screw magazine with a conveying strip that holds the screws.

According to DE3347323 a screw magazine with a conveying strip with screws comprising a axially displaceable feeder block that acts against the force of a feed spring, the block feeding screws successively with a back and forth reciprocating movement of the feeder block.

According to DE19745915 a screw driving device including a screw magazine is disclosed in which the feeding of the screws is synchronized with the screw driving process using a transport filament.

According to DE19727187 a screw driving device comprises a driving tool combined with an overload clutch, that has a limiting torque.

Such screw driving devices do not comprise a feature for first boring the holes in which the screws are set. This is especially necessary in hard materials and results in an additional preparatory work step. In addition self-tapping screws can be used instead of conventional screws.

According to DE3431630 an electrical hand tool that is so configured that it can be used either to drill or to drive comprises a switchable axially displaceable drill spindle with a clutch for transmission of torque, which when driving is disengaged via an axially cushioning pre-stressed drive depth stop at a torque that is dependent on the pressing force. A tool change is required between drilling and driving.

According to DE20018533U1 a drill is disclosed that comprises a drill bit that is configured as form-locking rotation driver element for screw heads. The wear on the drill tip when drilling results in an unsatisfactory rotation driver when driving screws.

SUMMARY OF THE INVENTION

The object of the present invention is to provide a screw driving device as an accessory for an electrical hand tool, which first drills a hole immediately before driving a screw or bolt and includes an associated working method.

Essentially a driving device that can be fastened to a hand tool includes a screw or bolt magazine, a feeder block that can be axially displaced against the force of a feeder spring, the block at least partially successively feeding screws or bolts by a back and forth reciprocating movement of the feeder block, and driving a tool that can be coupled rotationally in a form locked manner with a screw or bolt head, which includes a rotationally driven drill bit extending axially in a coaxial inner space and prestressed in a rotation driver position axially with a coupling spring relative to the driving device, in which a drilling tool bit is spaced axially from the screw or bolt head and is coupled in a rotationally form locked manner with the driving tool.

Because the drilling bit is axially spaced from the screw or bolt head and coupled rotationally and form locked with the driving tool, driving of the screw or bolt results in the rotary drive position automatically set by the clutch spring of the driving device, wherein in contrast on overcoming the axial bias of the clutch spring by the pressing force exerted by the operator, the rotationally driven drilling tool, which is axially moveably received in the driving tool, first drills a hole.

An advantage of this arrangement is the fact that the connection range of the driving tool is configured for a standardized screw or bolt head, optionally hardened, whose rotary drive surfaces are at least partially outside the diameter of the drilling tool, whereby external hexagonal screws, internal hexagonal screws, internal multiple-tooth screws, Allen head screws, torx screws, +head screws, slotted screws, and the like can be used.

The drilling tool advantageously has on its shaft at least one radially outwardly extending rotary drive wing which engages, at least in the rotation driver position into an associated rotation driver groove of the driving tool, whereby a technically simple rotation driver is realized.

The driving tool advantageously comprises a radial free axially extending inner space external of the rotation driver position for rotation-free reception of the rotation driver wing of the drilling tool, whereby the driving device does not rotate at the time of boring or drilling, which could otherwise generate an undesirable build up of heat with an abutting screw sleeve.

The driving device is advantageously arranged concentrically within the feeder block, whereby a compact construction is made possible.

Advantageously precisely at every second back and forth reciprocating movement of the feeder block a screw or bolt is fed into the driving tool, whereby alternatingly drilling and driving is made possible. The use of the screw/bolt feeder is old and well known in the art. Note U.S. Pat. No. 4,517,843 which discloses a mechanism feeding screws.

In the associated work method using this driving device, in a first step associated with drilling and without a screw associated in the driving tool, a high pressing force applied by the operator against prestress force of the feeder spring results in a back movement of the feeder block and an axial displacement of the drilling tool out of the rotation driver position of the driving toot against the prestress force of the clutch spring, whereby the drilling tool drills a hole in a workpiece; in a second step the operator lessens the pressing force up to the point of releasing both the feeder block and the clutch spring, whereby the guide block executes a back movement, removing the drilling tool from the drilled hole and couples it in the rotation driver position in a rotationally form locked manner with the driving tool; in a third step associated with the driving, the operator by applying a lesser pressing force against the prestressing force of the feeder spring, a back movement of the feeder block feeds a screw or bolt to the driving tool but not against the prestressing force of the clutch spring, whereby the drilling tool tip remains spaced axially from the screw or bolt head and the driving tool is rotationally coupled in a form locked manner with the screw head and the screw is consequently driven into the drilled hole and, in a fourth step, the operator lessens the pressing force up to the point of relieving the feeder spring, whereby the guide block executes a back movement and the driving tool releases itself from the screw or bolt head of the completely driven screw or bolt.

BRIEF DESCRIPTION OF THE INVENTION

The invention will be more completely described with reference to an advantageous exemplary embodiment, wherein:

FIG. 1 is an axially extending side view of a screw driving device embodying this invention when drilling; and FIG. 2 is a similar side view of the screw driving device when driving a screw or bolt.

DETAILED DESCRIPTION OF THE INVENTION

According to FIG. 1, a hand tool drilling device 1 having a drilling axis comprises a mountable driving device 2, a screw magazine 3 holding screws or bolts 4, a feeder block 6 axially displaceable against the force of a feeder spring 5, with the feeder block 6 at least partially successively feeding screws or bolts 4 in a back and forth reciprocating movement, and a driving tool 8 which can be arranged in a rotationally form locked manner with an axially extending drilling tool 9, concentrically within the feeder block 6 as a hexagonal screw head coupling part, which receives the rotationally driven drilling tool 9 in an axially limited manner, moveable in a coaxially hollow inside space 15 within the driving tool and is pre-tensioned axially by a clutch spring 10 relative to the driving device 2 in a rotation driver position X, in which a drilling tool tip 11 or the drilling tool 9 is axially spaced rearwardly from the screw head or coupling part and is coupled rotationally in a form locked manner with the driving tool 8. The drilling tool 9 comprises on its shaft 12 two radially outwardly projecting rotation driver wings 13, which exclusively in the rotation driver position X engage in two associated rotation driver grooves 14 of the driving tool 8, which has a radial free space 15 extending axially in front of the rotation driver position. As shown in FIGS. 1 and 2 the screw magazine includes a feeder element 3a and a transporting lock 3b in dot-dash lines. A magazine strip M carries the screws or bolts in transporting recesses R. A magazine strip M carries the screws or bolts in transportation recesses R and a spring force of the tensioin spring 5 shown in dot-dash lines effects the movement . Such a screw/bolt feeder is old and well known in the art.

The sequence of FIG. 1 and FIG. 2 illustrates the essential steps of the associated periodic working method using this screw driving device. According to FIG. 1 in a first step associated with the drilling operation a high pressing force F1 by the operator against the prestressing force of the feed spring 5 effects a back movement of the feeder block 6 and against the prestressing force of the clutch spring 10 an axial displacement of the drilling tool 9 out of the rotation driver position X with the driving tool 8, whereby in a second step the drilling tool tip 11 initially drills a hole 16 in the workpiece 17.

According to FIG. 2, in a third step associated with the driving of the screw or bolt a lesser pressing force F2 by the operator against the prestressing force of the feeder spring 5 effects a back movement of the feeder block 6, which feeds a screw or bolt 4 transversely of the drilling axis of the driving tool 8 but not against the prestressing force of the clutch spring 10, whereby the drilling tool tip 11 remains spaced from the screw head 7 and the driving tool 8 is coupled rotationally and form locked with the screw head and the screw 4 is thus driven into the initially drilled hole 16 due to the locked engagement of the driving tool 8 and the shaft 12 of the drilling tool 9.

What is claimed is:

1. Screw driving device (2) for combination with a hand drilling device (1) having a drilling axis and a front end for drilling into a workpiece (17), said screw driving device (2) comprising a magazine (3) for successively feeding screws or bolts (4) to be driven into said workpiece (17), and an axially extending driving tool (8) having a front end with a coupling part arranged to be coupled rotationally in a form locked manner with a screw head (7) of one of said screws or bolts (4), said driving tool (8) being axially moveable and laterally enclosing a rotatable drilling tool (9) within an axially extending hollow inner space (15) within said driving tool (8), said drilling tool (9) having a drilling tip (11) at the front end thereof, a clutch spring (10) axially biasing said driving tool (8), relative to the screw driving device (2) and thereby said driving tool (8) being displaced in a rotation driver position (X) in which said drilling tip (11) is axially spaced from said screw head (7) and coupling means connecting said driving tool with said drilling tool in a form locked manner and engageable with one of said screw heads (7) in engagement with said driving tool (8) in position to be driven into the workpiece.

2. Screw driving device, as set forth in claim 1, wherein said driving tool (8) has a front end containing said coupling part, said coupling part is shaped to receive a standard sized said screw head (7), and said coupling means for coupling said drilling tool (9) and said driving tool (8) with said coupling means located in said inner space (15) in the rotation driver position (X) radially outwardly from the diameter of said drilling tool.

3. Screw driving device, as set forth in claim 2, wherein said drilling rod (9) has an axially extending shaft (12) and said coupling means comprises at least one radially outwardly projecting driver wing (13) on said shaft (12) and in the rotation driver position (X) engages in a rotation driver slot (14) on said driving tool (8).

4. Screw driving device, as set forth in claim 3, wherein said driving tool (8) has an annular free space (15) which rotationally receives said drilling tool (9).

5. Screw driving device, as set forth in claim 1 wherein a feeder block (6) is axially displaceable against the force of a feeder spring (5), and said feeder block (6) in a back and forth reciprocating movement successively feeds screws or bolts (4) to said driving tool (8).

6. Screw driving device, as set forth in claim 5, wherein said driving tool (8) is arranged concentrically within said feeder block (6).

7. Screw driving device, as set forth in claim 5, wherein said feeder block (6) after drilling into said workpiece has a first and second reciprocating movement for each insertion of one of said screws or bolts.

8. Method of setting screws or bolts (4) comprising a screw driving device (2) as set forth in claim 1, comprising a first step for applying a forceful pressing force (F1) exerted by said drilling tool operator against a prestressing force of said clutch spring (10) for axial displacement of the drilling tool (9) out of the rotation driver position (X) whereby said drilling tip (11) bores a hole (16) in said workpiece (17), in a second step the operator reduces the pressing force for releasing the clutch spring (10) and for removing the drilling tool (9) from the drilled hole (16) and for rotationally locking of the drilling tool (9) in coupled engagement with the driving tool (8) in the rotation driver position (X), in a third step with the operator exerting a slight pressing force (F2) and supplying a screw or bolt into the driving tool (8) whereby the prestressing force of the clutch spring (10) is not overcome and maintaining the drilling tip (11) axially spaced from the screw head of the screw or bolt and rotationally coupled in a locked manner with the screw head (7) and driving the screw or bolt into the drilled hole (16), and in a fourth step, the operator lessens the pressing force so that the driving tool is detached from the screw head (7) of the completely driven screw (4).

* * * * *